G. SUNDBACK.
MAKING FASTENERS.
APPLICATION FILED OCT. 19, 1918.
1,434,857. Patented Nov. 7, 1922.
13 SHEETS—SHEET 4.
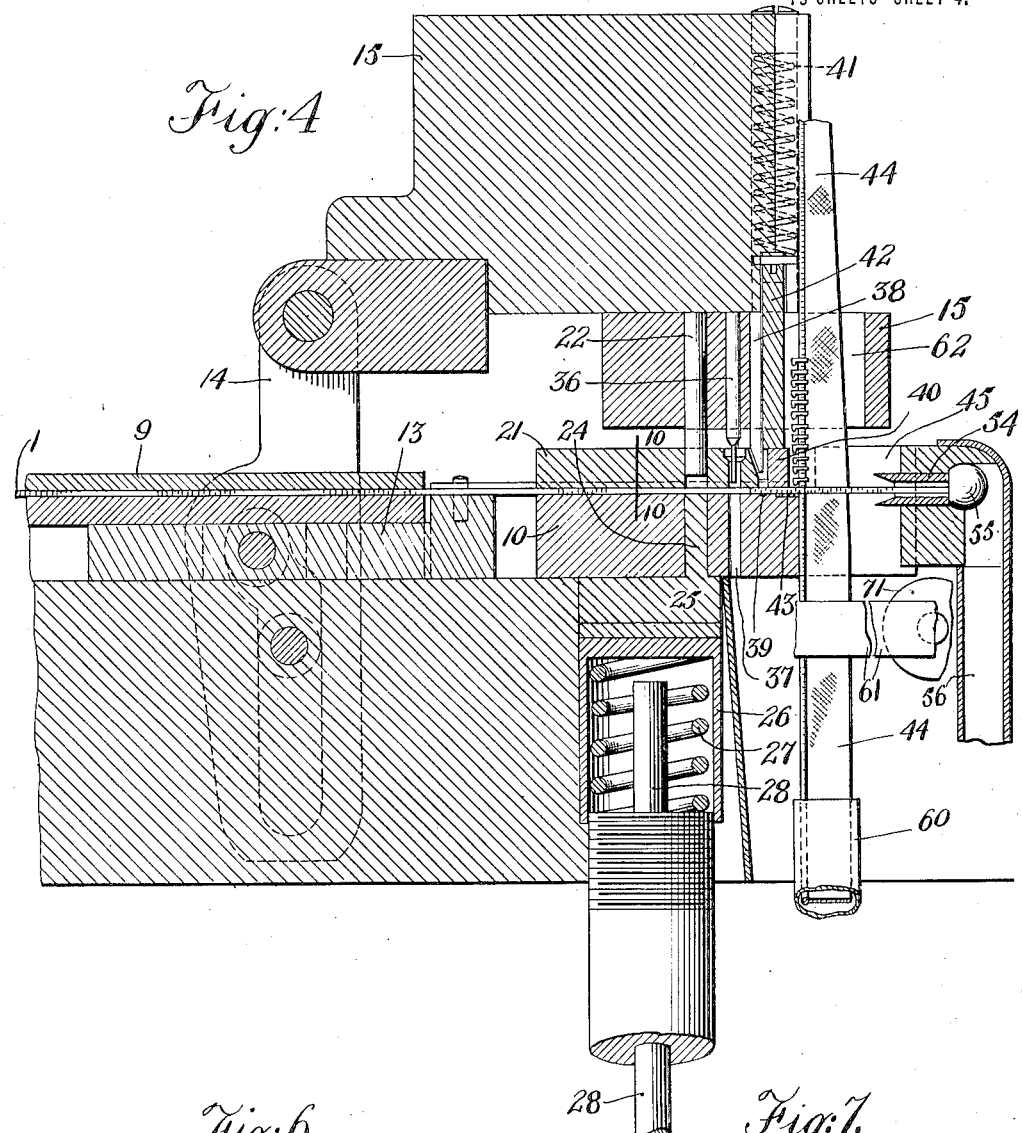
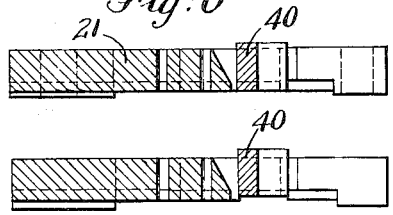
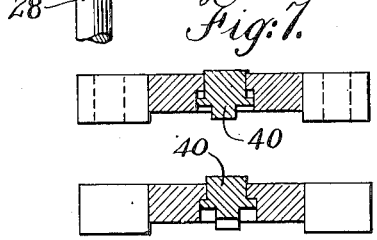
Inventor
Gideon Sundback,
By his Attorney

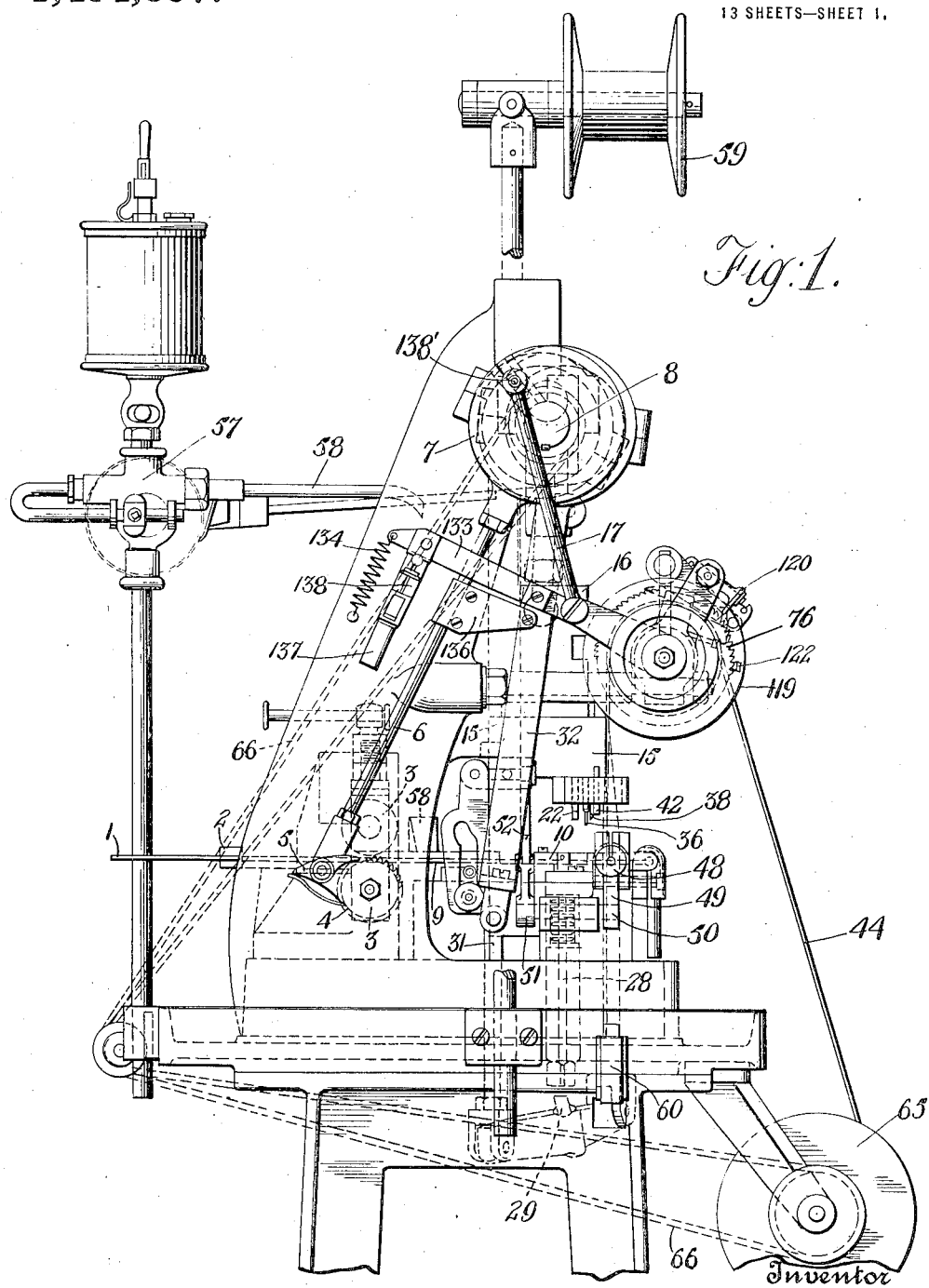

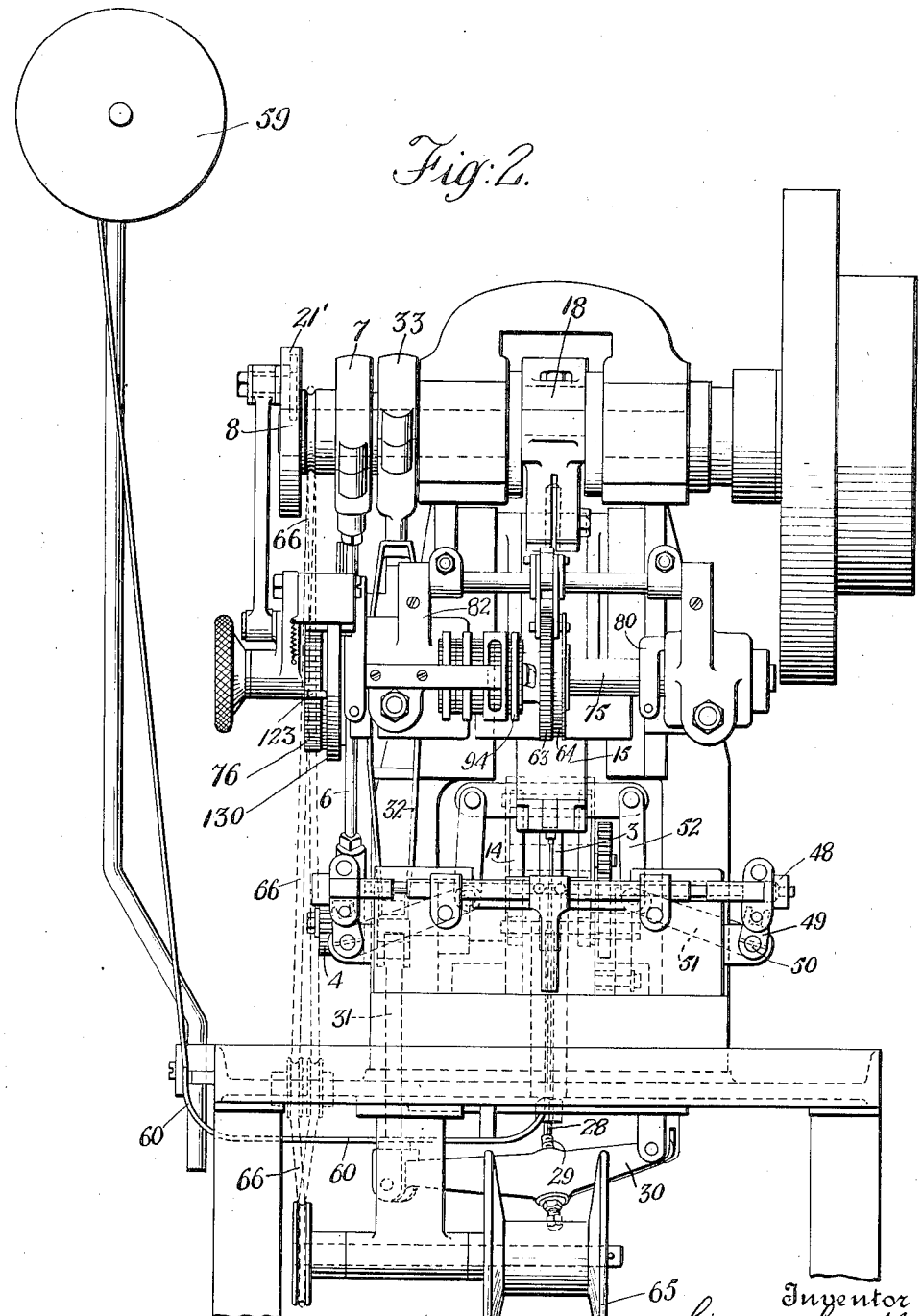

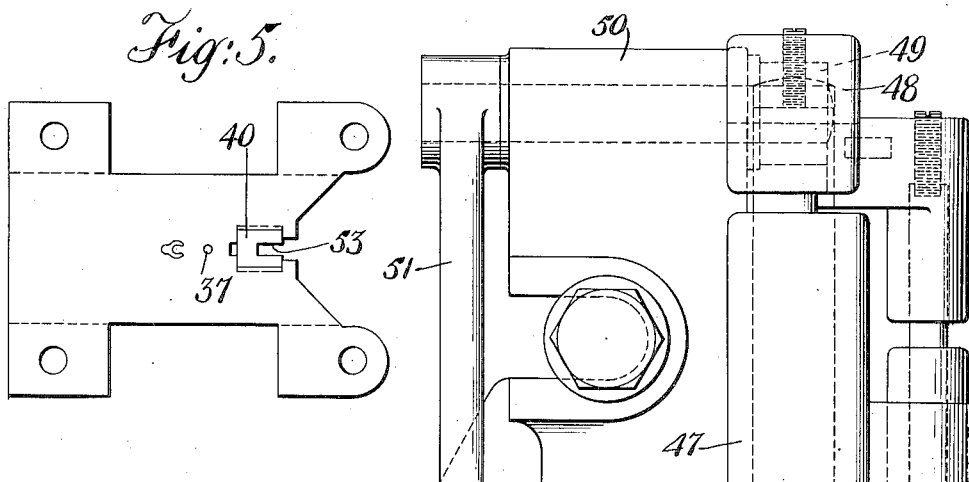
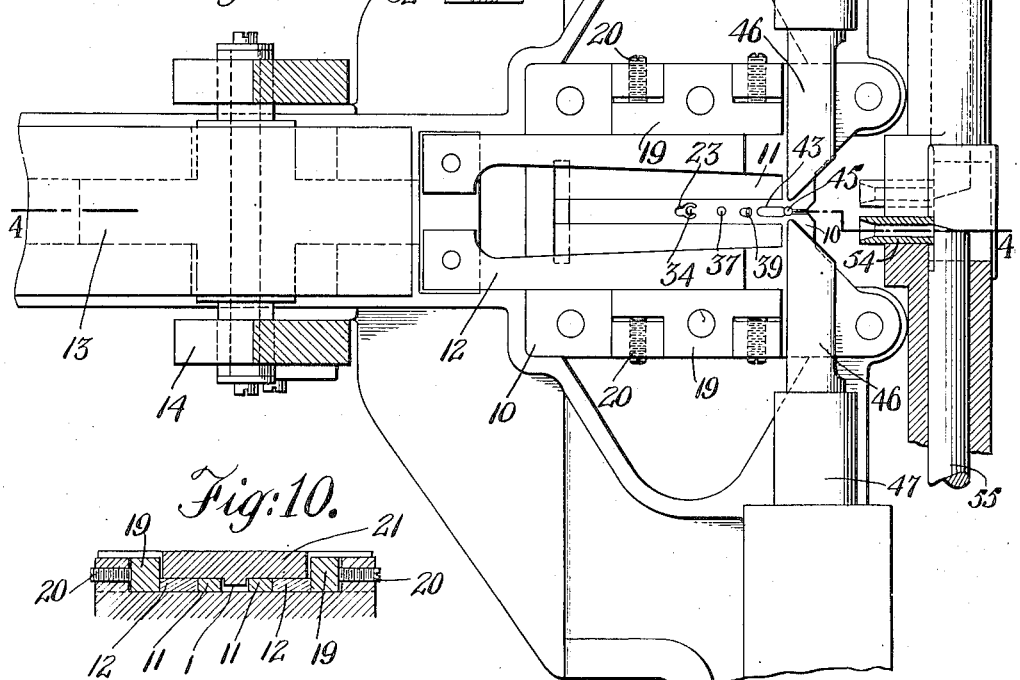

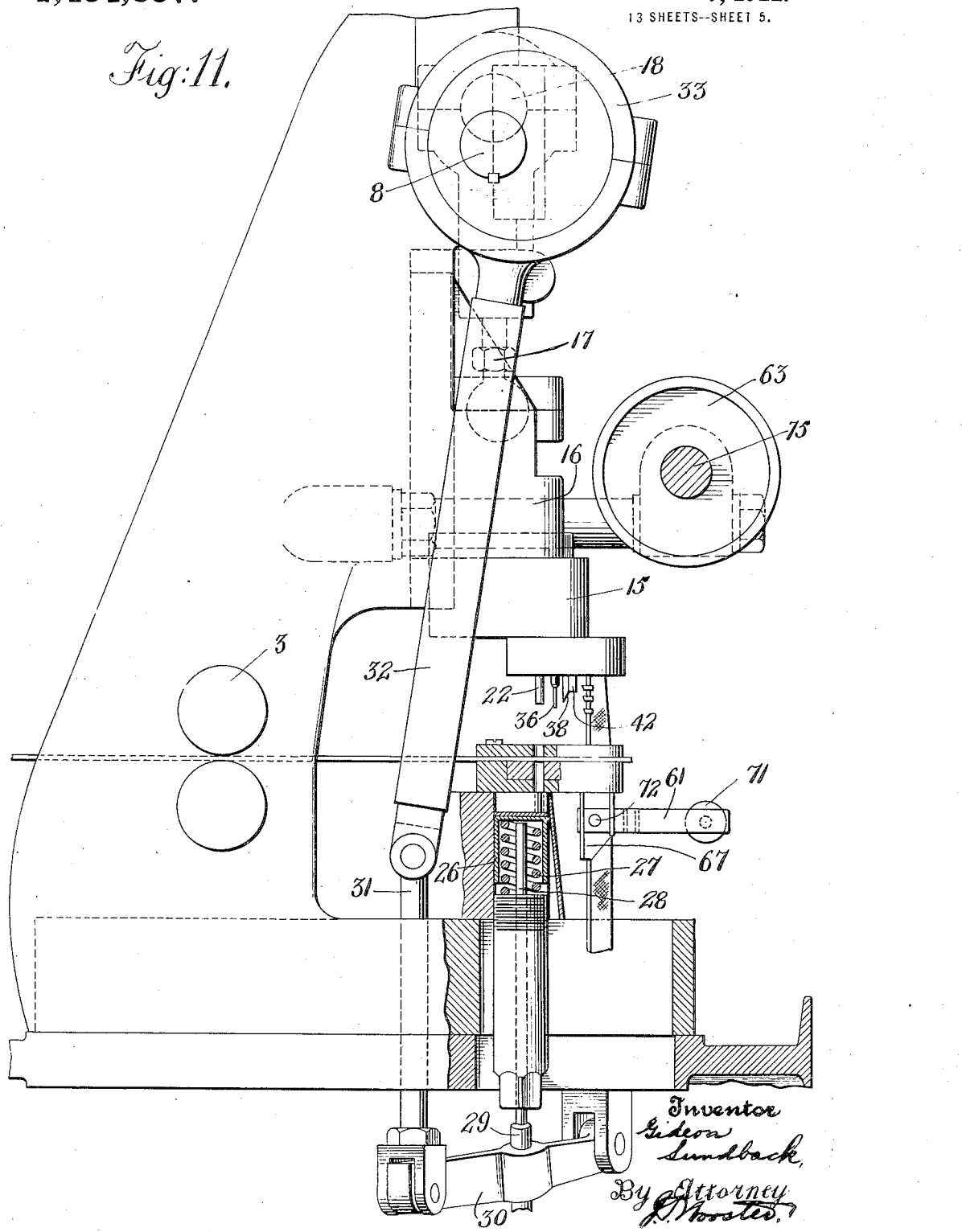

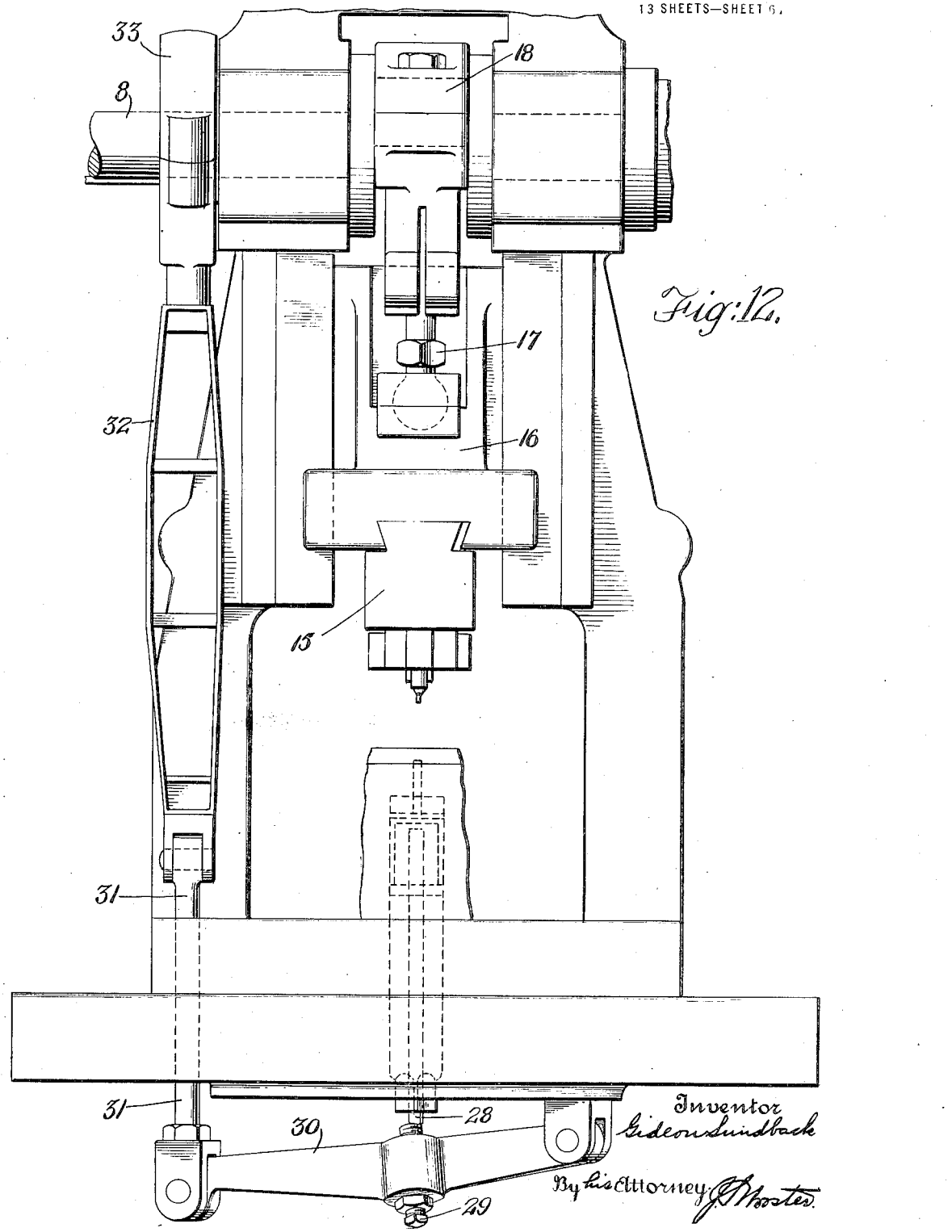

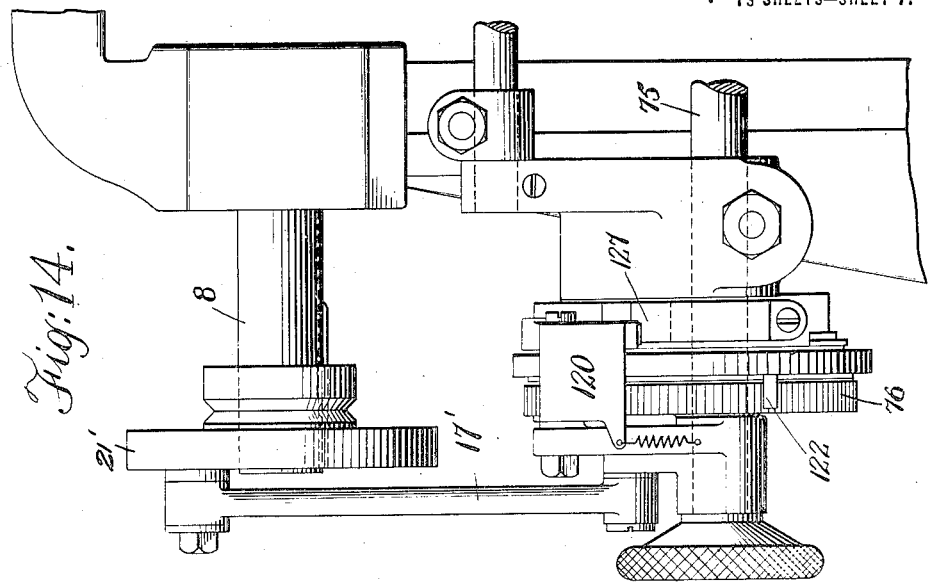
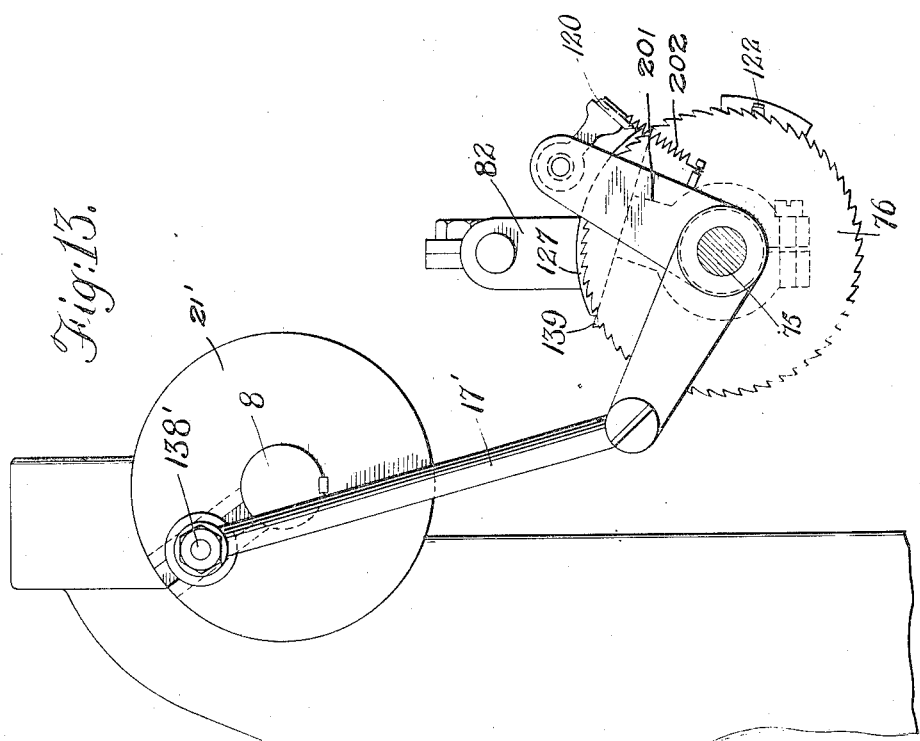

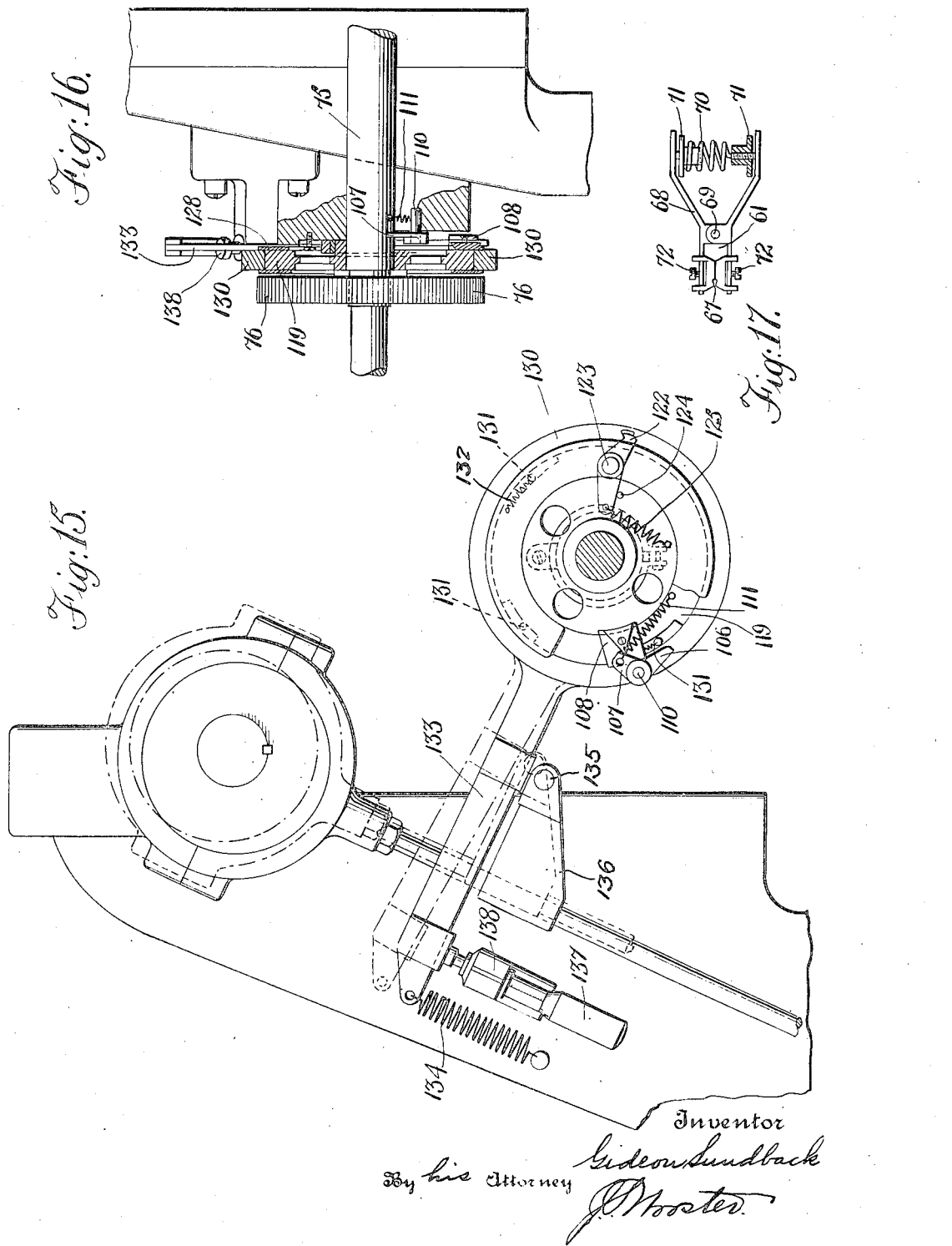

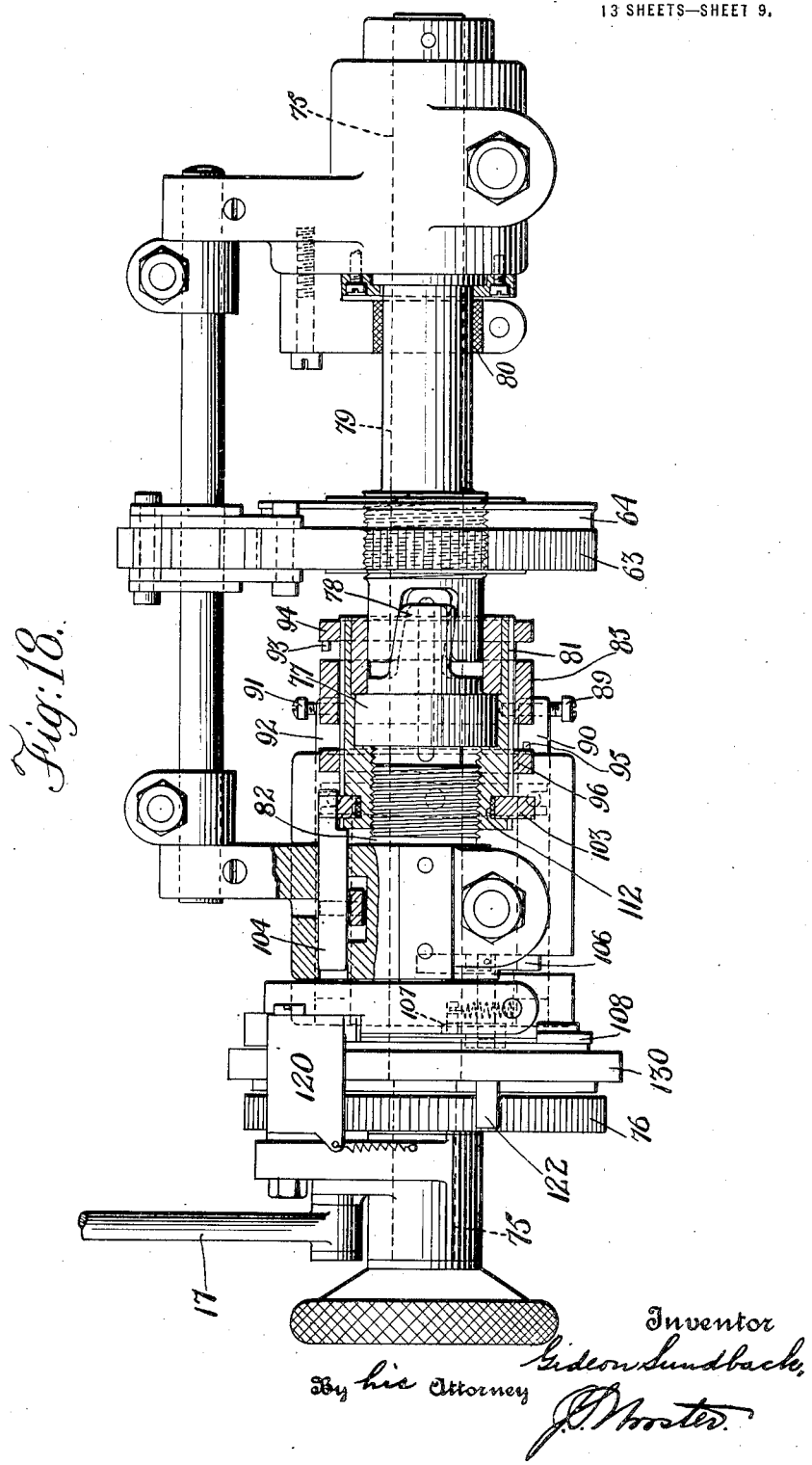

G. SUNDBACK.
MAKING FASTENERS.
APPLICATION FILED OCT. 19, 1918.
1,434,857.
Patented Nov. 7, 1922.
13 SHEETS—SHEET 10.
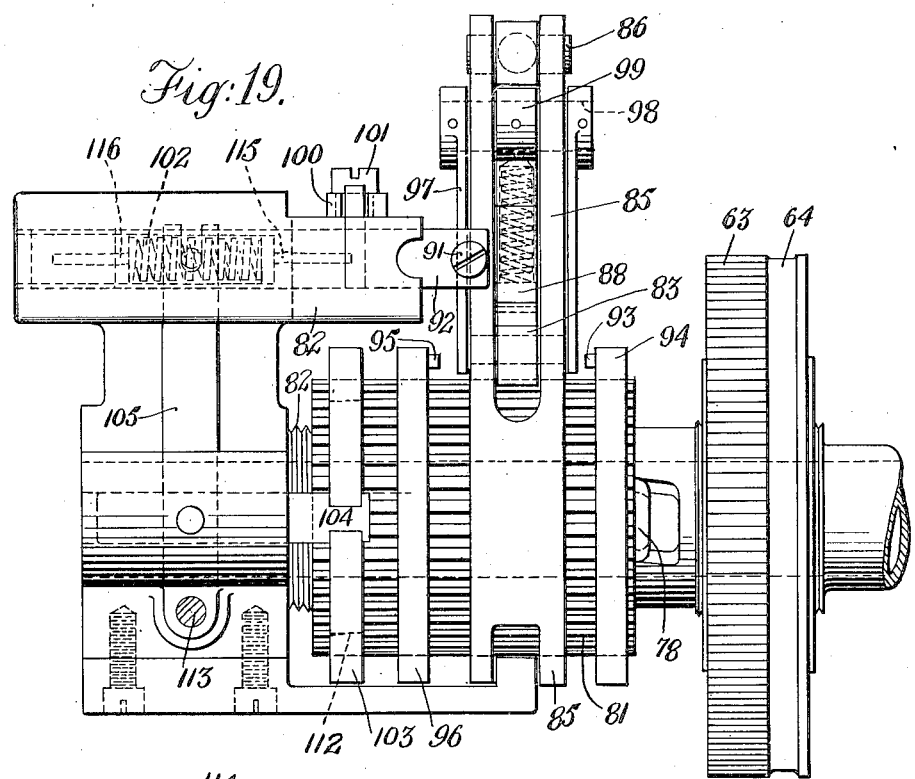
Fig. 19.
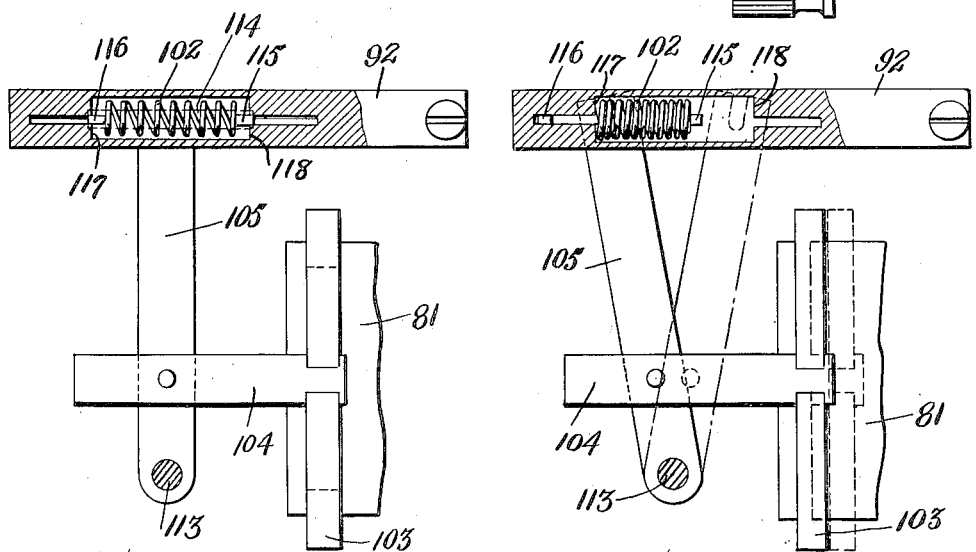
Fig. 24.
Fig. 25.
Inventor
Gideon Sundback,
By his Attorney

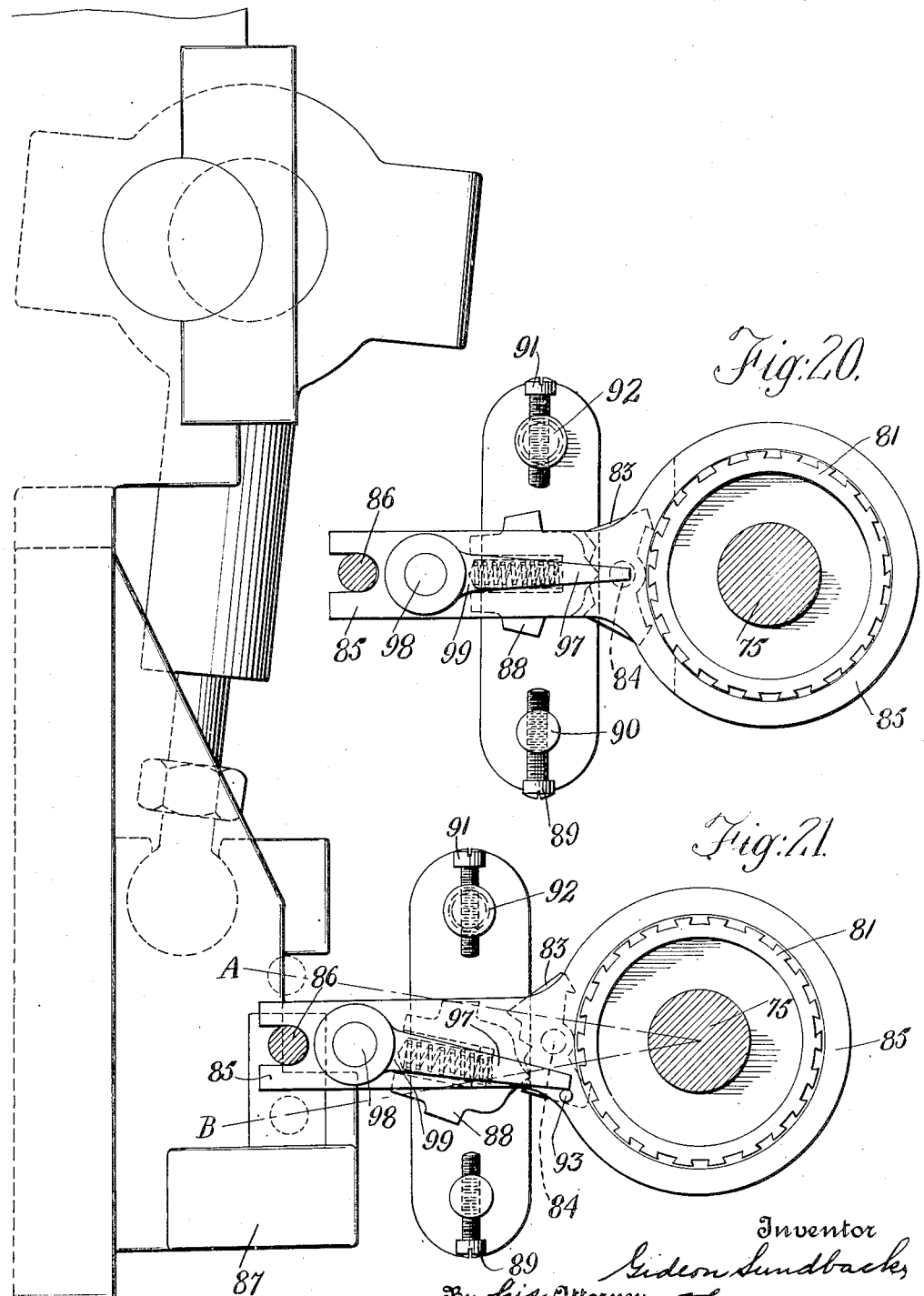

G. SUNDBACK.
MAKING FASTENERS.
APPLICATION FILED OCT. 19, 1918.
1,434,857.
Patented Nov. 7, 1922.
13 SHEETS—SHEET 12.
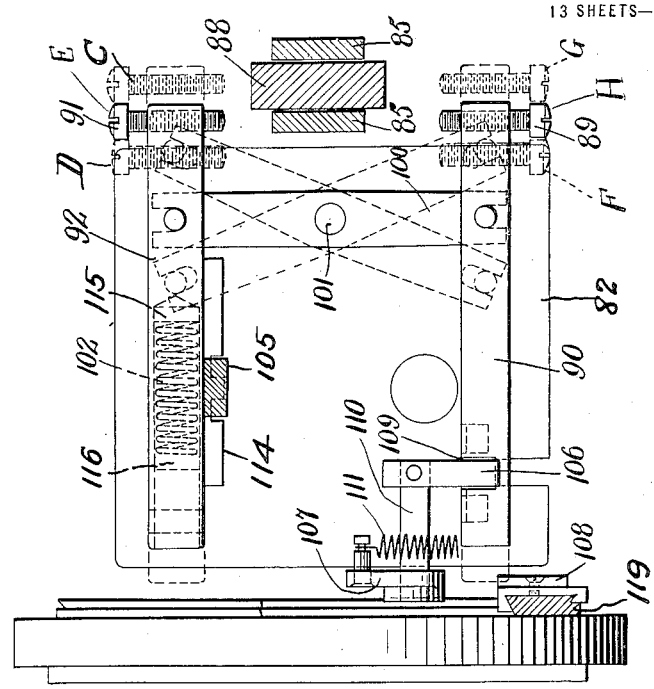
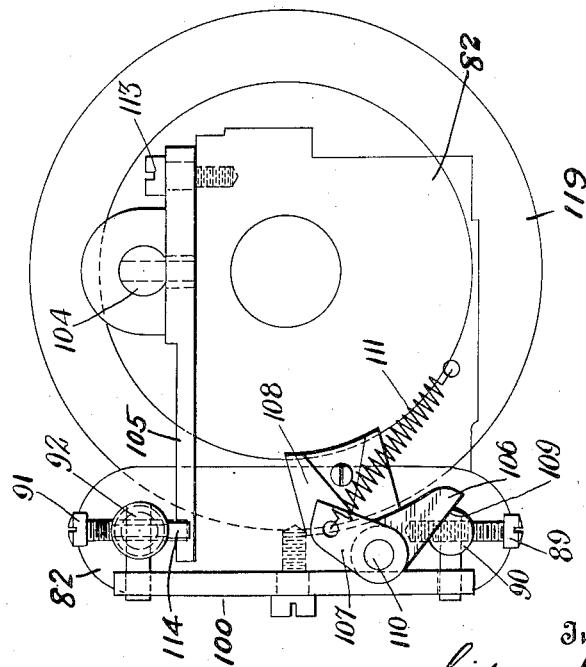
Inventor
Gideon Sundback,
By his Attorney G. SUNDBACK.
MAKING FASTENERS.
APPLICATION FILED OCT. 19, 1918.
1,434,857.
Patented Nov. 7, 1922.
13 SHEETS—SHEET 13.
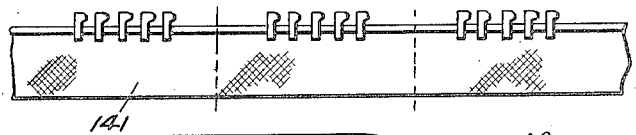
Fig: 27.
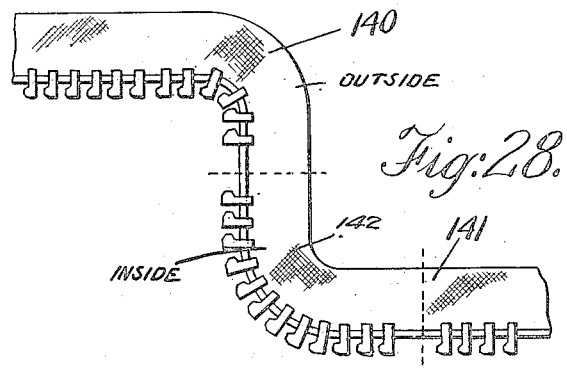
Fig: 28.
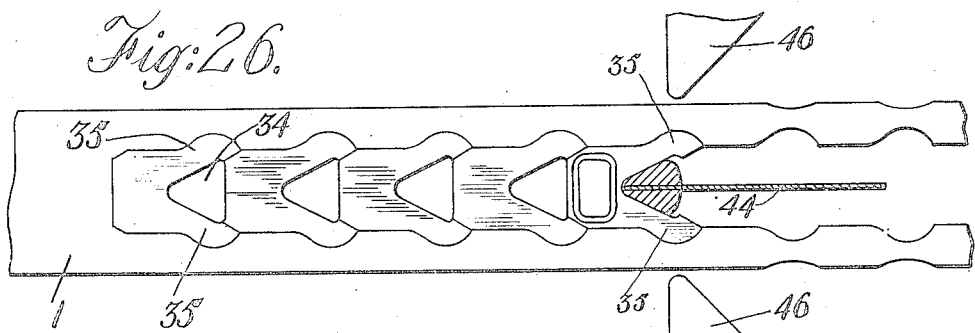
Fig: 26.
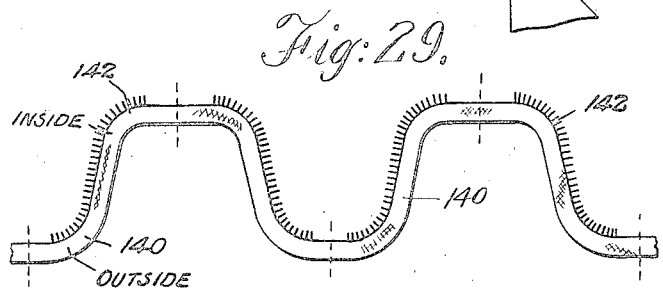
Fig: 29.
Inventor
Gideon Sundback,
By his Attorney Patented Nov. 7, 1922.

1,434,857

UNITED STATES PATENT OFFICE.

GIDEON SUNDBACK, OF MEADVILLE, PENNSYLVANIA, ASSIGNOR TO HOOKLESS FASTENER COMPANY, A CORPORATION OF PENNSYLVANIA.

MAKING FASTENERS.

Application filed October 19, 1918. Serial No. 258,918.

*To all whom it may concern:*

Be it known that GIDEON SUNDBACK, a subject of the King of Sweden, and resident of Meadville, in the county of Crawford and State of Pennsylvania, has invented certain new and useful Improvements in Making Fasteners, of which the following is a specification.

This invention relates to a machine and method for producing straight and curved fastener stringers, such as shown in my Patent No. 1,219,881 dated March 20, 1917, and also the curved stringers shown in my application Serial No. 159139, filed April 2, 1917.

By the method herein disclosed, fastener stringers embodying a predetermined number of interlocking jaw members are made on a straight stringer for a predetermined curve, which are cut apart and assembled on the curved closure, one stringer with varying spacing of the interlocking members combining with a succeeding one with different spacing to form a complete accurately fitting fastener.

The uses of this fastener are very diversified, straight fasteners as shown in said patent being used on corsets, money belts, footwear, clothing, stretchers, tents and other closures of various kinds, while curved fasteners as shown in said application are used for automobile curtains, hand hole closures, etc. where by reason of the curve, a wider or more convenient opening is obtained than with an equal length of straight fastener.

In order to produce a curved fastener which will be easy to apply and properly function, the spacing of the members on the outer stringer should vary relatively to the spacing on the inner stringer, while on a straight fastener, the spacing is the same.

The general type of machine is disclosed in my Patent 1,331,884, dated February 24, 1920, of which this application is a continuation in part, the novel features of this application being specifically in the tape feeding mechanism, and broadly in the combinations thereof with the jaw member making and setting mechanisms of said earlier application.

In the accompanying drawings,

Fig. 1 is a side elevation of a machine,

Fig. 2 is a front elevation,

Fig. 3 is a plan view showing the die and die block,

Fig. 4 is a vertical section on the line 4—4 of Fig. 3,

Figs. 5, 6, 7, 8 and 9 are details of the top or stripper plate, which hold the blank down on the dies;

Fig. 10 is a cross-section on the line 10—10 of Fig. 4 showing the passageway for the blank;

Figs. 11 and 12 are side and front elevations, respectively, showing the movements by which the punching is pressed back into the blank as the punchers are withdrawn;

Fig. 13 is a side view of the tape feeding mechanism;

Fig. 14 is a front view of the tape feeding mechanism;

Fig. 15 is a side elevation showing a further detail of the tape feed;

Fig. 16 is a further detail front view;

Fig. 17 is a plan view of the tape tension;

Fig. 18 is a front view of the variable tape feeding mechanism;

Fig. 19 is a top view;

Fig. 20 is an end view of a double pawl controlling mechanism in neutral position;

Fig. 21 is an end view in acting position,

Fig. 22 is an end view of the tripping mechanism;

Fig. 23 is a front view of Fig. 21;

Figs. 24 and 25 are top views of details;

Fig. 26 is a plan view on an enlarged scale showing the blank and jaw members at different stages;

Figs. 27, 28 and 29, show various forms of stringers produced by different settings of the machine.

1 represents a metal blank, which may be in the form of a flat strip, which is fed into the machine from the rear toward the front. The machine is applicable to separate blanks as well as to a continuous strip, but in making very small fasteners such as herein shown, which may be as small as one-eighth inch long and one-sixteenth inch wide when fastened and applied to the tape, it is preferable to employ a strip. Referring to Figs. 1 and 4, the blank 1 enters guide 2 and passes through feed rolls 3, 3, then through guide 9 to the die unit 10, and between the side guide plates 11, (see Figs. 3 and 10). The guide plates 11 are controlled by wedges 12 (see Figs. 3 and 10). The wedges 12 are operated through a slide 13 (see Figs. 3 and 4), and cam plates 14 by the punch head 15, held in the slide 16 (see Figs. 11 and 12) and moved up and down through connecting rod 17 and crank 18 on the main shaft 8. The feed rolls 3, 3 are operated by ratchet 4, pawl 5 and connecting rod 6 from eccentric 7 mounted on the main shaft 8 (see Figs. 1 and 2).

22 is the blanking punch which punches out the entire member and the piece 34 into die 23 (see Figs. 3 and 4). As the punch 22 draws out of the die, the plunger 24 carried by plunger holder 25 and sleeve 26, is actuated by spring 27 to press the punchings back into original place in the metal blank 1. The piece 34 (Fig. 26) lies in the blank between the jaws 35 of the punching. This scrap piece 34 is pushed out of the blank 1 by punch 36 (see Fig. 4) into the hole 37 in die unit 10. The next step is to press or form the punching in its final form ready to be clamped on the tape, and this is effected by punch 38 and recess 39 in die unit 10 (Figs. 4 and 5).

On the down stroke of head 15, as the punches are nearing the blank, the cam plates 14 (see Fig. 3) draw the wedges 12 toward the back, pressing the guide plates 11 toward each other with the blank in between, thus holding the blank firmly in place until released by the forward movement of the wedges 12 on the up stroke of head 15. Figs. 3 and 4 show the position at the moment the clamping movement of the guide plates 11 has been effected. To allow for wear and variation in the width of the blank, 1, the space between the guide plates 11 is adjustable by blocks 19 and set screws 20 (see Figs. 3 and 10).

The function of the guide plates 11 is of vital importance. At the time of punching, the two plates hold the material firmly against spreading and distortion either of the punching or of the blank. This enables the subsequent operations on the punching to be controlled through the blank, and ensures such perfect shape of the finished punchings and correct positioning thereof in the dies, as to produce a highly uniform and symmetrical fastener member and product. When the guide plates 11 draw tight around the blank 1, they not only bring the blank into a central position over the dies, but force the punchings, if they should happen to get out of place, into correct position lengthwise of the blank. The guide plates spread apart during the feed and allow an easy and free movement of the blank. It also allows the interlocking or projecting end of the fastener punching to lift up out of the recess 39 (see Fig. 4) in die unit 10 after the impression of punch 38.

At this time the blank strip 1, after reaching die unit 10, is confined between die unit 10 on the bottom and stripper plate 21 on the top (see Fig. 10.)

In order to avoid reliance solely upon spring 27 to press the punching back into its original place in the blank as punch 22 withdraws, a positive movement is provided. Rod 28 in addition to spring 27 exerts pressure on sleeve 26 thus forcing the punching into its place in the blank. Rod 28 is acted upon through screw 29 in lever 30 (see Figs. 11 and 12) and connecting links 31, 32 from eccentric 33 on main shaft 8. Upon the return of the punching to its proper place in the blank and with the co-operation of the side guides, 11, top of die unit 10 and stripper plate 21, the punching can now be fed forward by the blank feed rolls 3, 3, without any danger of becoming displaced. A displacement at this time would cause much trouble because of the extreme accuracy required in finished fastener members of such small dimensions.

The blank after return of the punching is fed forward as above stated so that the scrap piece 34 can be pushed out of the blank 1 by punch 36, and then the punching is pressed into recess 39 in die unit 10 by punch 38 to form the interlocking recess and projection. At this time, it is necessary to hold the blank and punching down onto the face of the die unit 10 and also to hold it against lateral spreading by contraction of the side guides 11. The stripper plate 21 partly performs this function, but in addition there is provided a yielding presser or floater 40 (see Figs. 5, 6, 8) which is mounted in stripper plate 21 and bears down on the jaws 35 of the punching, and on the blank 1, by means of springs 41 (see Fig. 4) and plunger 42. This plunger 42 is timed and adjusted to commence pressure as soon as the forward movement of the blank stops, and can be adjusted to exert a positive pressure upon the blank and punching by contacting with a lug on punch block 15 when the punches are in their lowest position. Thus the blank and punching are firmly held in position while the transversely elongated recess and projection are formed by the punch 38 and die recess 39.

When the blank 1, still carrying the fastener member, which is now finished and ready to be pressed on the tape, is again fed forward, the floater or presser 40 yields upwardly so as to permit the projection of the fastener member to lift out of the die recess 39 so that it can be carried forward into recess 43 (Figs. 3 and 4) ready to be set. To prevent the fastener member punching from lifting out of the blank 1 altogether, the lift of the yielding presser 40 is limited as shown in Fig. 9. Figs. 6 and 7 show the presser 40 at its lowest position and Figs. 8 and 9 show it at its highest position.

The finished punching is now carried forward by the next motions of the feed rolls 3, 3 until it reaches the position where the jaws 35 straddle the corded edge of the tape 44 (see Fig. 26). The tape 44 is fed intermittently upwards and at right angles to the blank feed through the hole and slot 45 (see Figs. 3 and 4) in die unit 10. In this position, the jaws 35 are clamped around the corded edge of the tape by side tools 46 (see Figs. 3 and 26) which simultaneously press toward each other on the outside of the blank 1, while the formed jaw member is being held between the top of the die unit 10 and the resilient presser 40 (see Figs. 3 and 4). The side tools 46 which set the jaw members on the carrier element, tape or stringer, are held in the slides 47, which are connected at 48 to lever 49, rock shaft 50, arm 51, and link 52 to punch block 15 (see Fig. 2). When the clamping movement is completed, the tape feeds up and lifts the jaw member clamped to its corded edge, out of the residue of the blank, 1, the tape and attached jaw member passing through slot 53 in floater 40 (see Fig. 5). There now remains of the blank 1 only the two edges, which are fed through the tubes 54 (see Figs. 3 and 4) and cut into small pieces by knives 55 connected to the actuating heads 48 of the side tools, the pieces falling down through chute 56.

In order to prevent slipping of the feed, the blank 1 is maintained clean and dry while engaged by the feed rolls 3, 3, and the necessary lubrication of the blank is done after it has passed the feed. This is accomplished by an ordinary oil pump 57 (see Fig. 1) which drips the lubricant down in tube 58 mounted centrally over the blank 1. Soap and water is preferably used as a lubricant, because it does not leave a stain on a fabric tape.

The tape is wound on spool 59, and leads through guide 60, then up through floating tension 61, through hole 45 in die unit 10, then through hole 62 in the punch holder, then around feed roll 63 having a knurled surface for the tape and a groove 64 for the jaw members, then the tape leads to winding spool 65 driven by belt 66 from the main shaft. The groove 64 serves as a leader and prevents lateral displacement of the tape in passing around feed roll 63. The grip is also assisted by the roughened surface in conjunction with tension 61.

The tension 61, shown in Fig. 17, comprises two tension plates 67 having guiding grooves for the cord, and mounted loosely on the ends of levers 68 which are pivotally connected at 69 and normally pressed apart by spring 70 mounted between screw bushings 71, which can be turned so as to vary the spring pressure at plates 67. The pressure of the jaws is transmitted through screw 72 located at about the center of plates 67, so that the plates can rock slightly on the ends of the screws and adjust themselves to irregularities in the tape without varying the friction. In order to prevent puckering the plates 67 at the entering side are tapered so as to smooth out the tape before it reaches the setting point of the jaw members. It will thus be seen that the tape is positively controlled by the feed roll 63, and the varying control of roll 63 for varying the spacing between jaw members on a single fastener stringer, and the blank spacing between successive stringers will now be described.

Another part of the mechanism when put into operation automatically produces an auxiliary movement of the tape roll by which the regular spacing between the interlocking members is alternatingly increased and decreased in any desired portion of a group of members or stringer, thereby producing in one group an increased spacing corresponding with the decrease in spacing between members in a following group. Two of these alternating groups form a fastener which will, by reason of the difference in spacing, take a curve with the larger spacings on the outside and the smaller spacings on the inside. The increase or decrease in the tape feed added to or taken off from the regular feed is uniform so that the spacing between the members within the portion of increase or decrease remains constant. As a consequence the curve of the fastener is circular in form of a radius proportionate with the difference between spacing of the members on the out and inside stringer. The mechanism is adjustable to make any desired length of curve within its limits.

With this feeding mechanism it is optional to make either straight or curved or a combination of straight and curved fasteners in predetermined lengths. The length of a fastener is determined by the number of interlocking members on the tape grouped together between the blank spaces. When the mechanism is set for producing straight fasteners the spacing between the members in a group is constant.

For each two stringers the mechanism for increasing and decreasing the regular spacing makes one reciprocating trip thus making one complete curve to each fastener only. But as the timing of the mechanism in its relation to the blank spacing between the stringers is adjustable the setting can be made to produce the blank space which divides the stringer in center of a curve or any other part of the curve. It follows that if part of the curve for which the mechanism is set forms the end of one stringer and the other part of the same curve forms the beginning of another stringer a fastener which in effect has two curves, one curving in the opposite direction to the other is produced.

Tape feed roll 63 is rotatably mounted on shaft 75 and is driven thereby through a clutch member later to be described. Keyed to shaft 75 is a ratchet wheel 76, and rotatably mounted on shaft 75 is a bell crank 201, the latter carrying pawl 120 pivotally mounted on one arm thereof, and having its other arm pivoted to and oscillated by connecting rod 17′. Pivoted to the other end of connecting rod 17′ is crank pin 138′ in crank plate 21′, the latter being keyed to shaft 8. Crank pin 138′ is carried by a block clamped or otherwise adjustably secured in a radial slot in crank plate 21′, and by varying the radius of crank pin 138′ the throw of pawl 120 may be adjusted as desired. Spring 202, between bell crank 201 and pawl 120 tends to maintain the latter in engagement with the teeth of ratchet 76. The actual throw of pawl 120 is very much greater than is required for the spacing of the fastener members, only a portion of the actual throw being used for this purpose, while the full throw is used to feed blank spaces. To secure the required effective throw for proper spacing, a shield 127 is provided over part of the arc of travel of pawl 120 to hold the latter out of engagement with the teeth of ratchet 76. Pawl 120 passes over shield 127 near the end of its throw, and spring 202 then draws it into engagement with the teeth of ratchet 76, giving the latter a motion of intermittent rotation. Shield 127 is angularly adjustable to provide for the feeding of any desired number of teeth. For the feeding of uniformly spaced fasteners for straight lengths, the movement of tape feed roll 63 is identical with that of shaft 75. To increase or diminish the space between the fasteners, and so provide for curved lengths, the motion of shaft 75 is modified by a clutch connection, later to be described, in transmitting such motion to tape feed roll 63.

The spacing control obtained by variable movement of feed roll 63 through pawl and ratchet tripping and differential driving means is shown in Figures 18–25. Referring to Figure 18, ratchet 76 acted upon by pawl 120 is keyed to the shaft 75 which carries splined sleeve 77. This sleeve 77 has a spiral clutch connection 78 with the longitudinally fixed sleeve shaft 79 carrying feed roll 63. 80 is a friction brake. The sleeve 77 revolves within and moves longitudinally with drum 81 threaded on to the longitudinally stationary extension of bearing 82, so that by rotary motion of drum 81 the sleeve 77 is moved axially. For regular spacing the drum 81 is stationary and the intermittent uniform movement of ratchet 76 is imparted through shaft 75, sleeve 77, sleeve shaft 79 onto the tape roll 63. To increase or decrease the regular intermittent rotary motion of roll 63, the drum 81 is revolved intermittently corresponding therewith and moves the sleeve 77 axially in one or the other direction, thereby, through the spiral clutch 78, adding to or substracting from the uniform movement imparted by ratchet 76. The drum 81, Figures 20 and 21, is revolved by double pawl 83 pivoted at 84 on rocker arm 85. The latter is connected by pin 86 to cross head 87 and reciprocates, fixed in its vertical plane, between the positions A and B. The back of pawl 83 has three notches, one central which by reason of a good fit with the pointed end of plunger 88 serves to hold the pawl in neutral position, as illustrated in Figure 20, and one at each end to position the spring pressure of plunger 88 to hold the pawl in one or the other of the actuating positions. If the double pawl 83 is in actuating position on one side the feed roll 63 will be accelerated relatively to ratchet 76 through the spiral clutch 78, and if in the other actuating position the feed roll will be retarded, while if the pawl is in neutral position, as shown in Figure 20, the drum 81 is at a standstill and tape roll 63 is acted upon only by the drive through ratchet 76.

The position of the plunger 88 relative to the three notches on the back of pawl 83 is controlled by screws 89 on plunger rod 90 and screw 91 on plunger rod 92, (see Figs. 20, 21, 22, 23) on one hand and by pin 93 on ring 94 and pin 95 on ring 96, (see Figs. 19, 20 and 21) on the other. The screws 89 and 91 act on the spring plunger 88 to move it out of neutral position into one or the other actuating positions, in other words control the starting of the increased or decreased spacing of the fastener members, whereas the stopping is controlled by the pins 93 and 95. The rings 94 and 96 (see Fig. 19) are adjustably fastened to, as by set screws (not shown), and move with the drum 81 whose length of travel is determined by their positions. Revolved by the pawl 83, the drum carries the pin 93 on ring 94 in a screw thread line until the pin pushing on one branch of the double lever 97 (see Figs. 21 and 19) connected with the spring plunger 88 through shaft 98 and spring barrel 99 throws the spring plunger 88 into the neutral position on back of pawl 83. Figure 21 shows pin 93 about to act on double lever 97. The pin has been brought up into this position by the last upward stroke of rocker arm 85 and is now held by collar 103

(Fig. 19) acting as a brake on the drum 81 to which the ring 94 and pin 93 are fastened. The rocker arm 85 (Fig. 21) is on its downward stroke and plunger 88 will have moved into the neutral notch on back of pawl 83 when it reaches the end of the stroke at position B, thus stopping the movement of the drum 81. The pawl now remains neutral and the drum idle until the spring plunger 88 acted upon by screw 89 on plunger rod 90 (see Fig. 20) throws the pawl 83 into actuating position and starts the drum in the opposite direction to continue until pin 95 on ring 96 (see Fig. 19) arrests the motion by bringing pawl 83 into neutral position through pressure on the other branch of double lever 97. The duration of increased or decreased spacing, in other words the length of a curve in the fastener, is thus controlled by the position of rings 94 and 96 on the drum 81. The collar 103 (see Fig. 18) mounted slidably in a slot of drum 81 has a brake lining 112 which serves to hold the drum against the back stroke of the pawl 83 and pressure on pins 93 and 95 required to throw spring plunger 88 into neutral position as well as to prevent accidental rotary movements.

To start the drum 81 the pawl 83 is thrown from neutral into actuating position by one or the other of screws 89, 91 on plunger rods 90, 92 (see Figs. 23, 24 and 25). The latter slide in bearing 82 and are connected by lever 100 pivoted at 101 on bearing 82. When screw 91 is in central position at E (Fig. 23) the screw 89 is in central position at H. The positions at F and G of screw 89 correspond with positions C and D of screw 91, respectively. Only one of the said screws can be in actuating position at once. To move pawl 83 out of neutral position screw 91 is brought to position C (see Fig. 23) directly above spring plunger 88, so that when rocker arm 85 moves into position A (see Fig. 21) the spring plunger is caused by screw 91 to throw pawl 83 into actuating position as shown in Fig. 21. To revolve drum 81 in the other direction, screw 89 is similarly brought to position G (Fig. 23) to move spring plunger 88 in the other direction as rocker arm 85 moves towards position B shown in Fig. 21. The timing of a period of increased or decreased spacing or in other words the position of a curve relative to the straight portions of a fastener and the blank spaces between the groups of members is thus controlled by the positions of screws 89 and 91 on the plunger rods 90 and 92.

The movement of the plunger rods 90 and 92 carrying the screws 89 and 91 is controlled by the axial movement of drum 81 through collar 103, rod 104, lever 105, pronged slide 114, and spring 102, (Figs. 18-19) on one hand and catch 106, dog 107 and trip 108 on the other, (Figs. 22-23). Catch 106 fits slot 109 in plunger 90 and is solidly connected with dog 107 through shaft 110. Actuated by spring 111 (Fig. 22) the catch 106 is constantly pressing against the plunger rod 90 and when this rod in its travel back and forth brings the slot 109 in line with the catch 106 (Fig. 23) the latter snaps in and locks the plunger rods and screws 91 and 89 in their respective positions E and H. The release of rod 90 is accomplished by the trip 108 (Figs. 22-23) slidably secured to friction ratchet 119. This ratchet makes one revolution for each group of interlocking members or for each stringer. Once in each revolution the trip 108 lifts the catch 106 out of the slot 109 in rod 90 and releases the rods 90 and 92 for longitudinal movements. Referring to Fig. 19 the rod 104, dovetailed to collar 103 in the slot of drum 81, travels back and forth with the axial movement of the drum and through its connection oscillates the forked end of the lever 105 pivoted at 113 as shown in Fig. 25. Guided in a slot in the bearing 82 and interlocked with the forked end of lever 105 is the slide 114, see Figs. 22 and 23, having two prongs 115 and 116 extending upwards into a slot in plunger rod 92, (Fig. 23). The two prongs embrace a compression spring 102 lodged within the plunger 92 (Fig. 24). Moved by the lever 105 the prongs on slide 114 oscillate with the movement of the drum 81 and press the spring 102 against the plunger rod 92 at point 117 when moved in one direction and at point 118 when moved in the other (Fig. 25).

Friction ratchet 119 determines the length of a stringer by timing the increased feed of tape to produce a blank space which separates one group of members from another.

The driving pawl 120 for ratchet 76 automatically feeds ratchet 76 the excess length of tape required for this purpose, through a second pawl 122 (Figs. 15 and 16) pivoted on pin 123 and held against pin 124 by spring 125. Pawl 122 is mounted on the friction ratchet 119 and extends over the teeth of ratchet 76. The friction ratchet 119 is rotatably mounted on shaft 75 (Figures 13 and 14) between ratchet 76 and shield 127, and is held against accidental rotary movement by brake 128 (Fig. 16). As the secondary pawl 122 is carried around on the frictoion ratchet 119, it reaches the position where pawl 120 at the rear end of its stroke rides over it. At the beginning of the forward movement pawl 120 then catches the secondary pawl 122. The spring 125 (Fig. 15) yields to the pressure of pawl 120 allowing the secondary pawl 122 to swing until its forward edge engages the teeth of ratchet 76. The swinging movement being arrested, continued pressure of pawl 120 carries with it the secondary pawl 122, the two ratchets 119 and 76, the shaft 75 and the tape. The ratchet 119 is moved by ring 130 (Fig. 15) through rolls 131 and springs 132. Arm 133 which operates ring 130 is operated by the spring 134 and connecting rod 6 through pin 135 in clamp 136 fastened to connecting rod 6. Eccentric 7 is operated by shaft 8 and carries the connecting rod 6. The stroke of arm 133 is adjustable by the micrometer head 137 in bracket 138 (Fig. 15) attached to the frame of the machine. The adjustment ranges from a maximum length equal to the throw of connecting rod 6 to a very small minimum. Thus the secondary pawl 122, carried around by the friction ratchet 119, is made to complete a single revolution during a predetermined number of operations of the machine according to the setting of micrometer 137, and in this way determines the length of the fastener. When the secondary pawl 122 is effective, it will be seen that a long throw will be given the tape feed, equal to the full stroke of pawl 120.

The trip 108 slidably mounted on the friction ratchet 119 which carries the secondary pawl 122 is adjustable to any position on the ratchet so as to release plunger rods 90 and 92 for action to start the increase or decrease in the spacing at any point of a stringer. This trip 108 starts one curve at a predetermined point in each stringer, but if set in a position relative to the pawl 122, so as to start the curve near the end of one stringer and the curve continues on the next, a fastener made up of stringers as shown in Fig. 29, having one curve at each end will be produced.

When pin 93 on ring 94 stops the barrel 81 (Fig. 19) by moving the spring plunger 88 and pawl 83 (Figs. 20 and 21) into neutral, the rod 104, (Fig. 19) has moved with the drum and brought the lever 105 into a position illustrated in Fig. 25, where the position of prong 115 on slide 114 held by the lever exerts pressure on plunger rod 92 at point 117. The plunger rod 92 by reason of its connection through lever 100 with plunger rod 90 is held by catch 106 in slot 109 (Fig. 23) and screws 89 and 91 locked in their respective positions H and E. The rocker arm 85 is brought to idling up and down between A and B (Fig. 21). The sleeve 77 is held axially by the idle drum 81 and revolving intermittently with the motion of shaft 79 transmits to tape roll 63 the movements of ratchet 76 and feeds the tape for regular spacing of a straight fastener. The friction ratchet 119 is travelling in accordance with the stroke of arm 133 (Fig. 15) and brings the trip 108 (Fig. 22) in a clockwise direction up towards the trip 107. Continuing the movement of the trip 107 catch 106 is lifted out of the slot 109 and forced by the spring pressure at point 117 (Fig. 25) the plunger rods 92 and 90 (Fig. 23) are suddenly thrown into new positions and bring screws 89 and 91 from their neutral positions at H and E into positions G and D respectively (Fig. 23). Screw 89 is now directly in line with spring plunger 88 and forces it out of neutral position shown in Fig. 20, upwards, as the rocker arm moves down from position A into B (Fig. 21) and brings pawl 83 into actuating position. The drum 81 now commences its intermittent rotary movement in an anticlockwise direction and guided by the left threads on bearing extension 82 (Fig. 18) moves axially towards the tape feed roll. Sleeve 77 now transmits to the tape feed roll 63 for each revolution of the machine the regular forward movement of pawl 76 as well as a regular slight backward movement as the clutch end of sleeve 77 moves longitudinally into the clutch end of sleeve shaft 79 (Fig. 18) producing as a result a shortened forward movement of the tape feed roll 63 or a decreased spacing between the members going onto the tape. As the drum 81 continues its axial movement the lever 105 releases the spring pressure at point 117, (Fig. 25) and gradually exerts pressure in the opposite direction through prong 116 at point 118. Free to move, the rods 90 and 92 yield to the spring pressure and move the screws 89 and 91 back from the positions G and D towards H and E, (Fig. 23). When reached, the catch 106 which has meanwhile been passed by the trip 108 and now controlled by spring 111 snaps into the slot 109 and locks the screws 89 and 91 in the H and E positions. The lever 105 continues to move with the drum and prong 116 (Fig. 25) is now compressing spring 102 against point 118 in rod 92 which is now locked. The movement of the drum 81 continues until pin 95 on ring 96 comes in contact with the double lever 97, and brings pawl 88 into neutral, stopping the drum and the backward movement imparted to feed roll 63 by the axial movement of sleeve 77, thus reverting the tape feed roll 63 to the regular forward movement of ratchet 76 and spacing of the members for a straight fastener. The trip 108 has meanwhile completed a round with the friction ratchet 119 and again lifts the catch 106. The pressure of spring 102 now directed at point 118 (Fig. 25) snaps the screw 91 on rod 92 (Fig. 23) into actuating position at C and starts the drum in the opposite direction. Sleeve 77 is now moving away from tape feed roll 63 and thereby transmits a slight forward movement to the tape roll, in addition to the regular movement by the ratchet 76, and the machine is thus producing a stringer with increased spacing between the members until the drum is again stopped by pin 93. The secondary pawl 122, which in connection with pawl 120 and ratchet 76, acts upon the tape feed roll 63 to effect the blank space of tape dividing one stringer from another, travels with the friction ratchet 119 at the same rate of speed as the trip 108. The latter is adjustable on the friction ratchet to any position in relation to pawl 123, and when set, repeatedly sets the drum 81 into motion at the predetermined time relative to the action of pawl 123, in other words, places the curve in any desired position in relation to the ends of the fastener. Fig. 29 illustrates a stringer where the action of pawl 122 on the tape roll has taken place while drum 81 was in motion and half ways between the rings 94 and 96, and in this way places, half of one curve at the beginning and half of the other curve at the end of the same fastener.

In order to produce curved fasteners without any straight portions the travel of the friction ratchet 119 is timed by micrometer head 137 (Fig. 15) to correspond with the length of travel of the drum as regulated by the positions of rings 94 and 96, so that trip 108 on the friction ratchet starts the drum off on a reciprocating trip immediately it is brought to rest by either one of the rings. If the pawl 122 acts and produces the blank space simultaneously with this stopping and starting of the drum, that is, groups the members of increased spacing on one stringer and members of decreased spacing on the next, a circular fastener results, whereas if the blank space groups members of increased spacing followed by members of decreased spacing in succession on the same stringer an S shaped fastener will be the outcome.

The radius of the curve is fixed either by the teeth on drum 81, or by the pitch of the threads on bearing 82 and drum 81, or by the pitch of the spiral cam clutch 78. The length of the curve varies with the travel of drum 81 as regulated by the distance between rings 94, 96. The drum should be stopped before trip 108 has made a complete revolution. The acceleration and retard can be timed to occur at any point of the stringer, thereby permitting S shaped stringers such as shown in Fig. 29 to be made.

For making straight fasteners with uniform spacing, the trip 108 is removed from friction ratchet 119, so that the double pawl 83 remains in neutral position after having been once brought there by pins 93 or 95 on rings 94 or 96. The variable spacing mechanism is thus rendered entirely inoperative as long as desired.

Figure 27 shows the strip for straight closure wherein the spacing is uniform while Figure 28 shows the strip for curved closure wherein, the spacing is varied, the spacing of the curved portion 140 of one group forming the outside or convex portion of a curve is the greatest and the spacing of the curved portion 142 of the group forming the inside or concave portion of a curve is the least, varying from the normal or standard interlocking spacing of the straight portion 141 to permit a free and proper action of the fasteners when applied to curved closures. The terms "convex" and "concave" are used with reference to the respective positions occupied by the tape in relation to the mean line of the closure, i. e. the curve defined by the engaging portions of the fasteners. In assembling, the strip is cut as indicated by the dotted lines in Figs. 28 and 29, and a convex portion is fitted to a concave portion, either of which portions being first inverted.

If not much variation in the lengths of fasteners is required, the friction ratchet with secondary pawl 122 can be dispensed with. In this case the ratchet 76 is provided with a high tooth 139 (see Figure 13) which will project up above the surface of shield 127 so as to be caught by pawl 120 during each revolution of ratchet 121. By changing the throw of pawl 120 by adjusting clamp 138', the length of the metal part of the fastener can be varied to a limited extent without changing the over-all length including the tape ends. To materially change the length of the fastener the number of teeth in the ratchet 76 can be varied, and also the diameter of feed roll 63.

The normal spacing may be varied independently of clutch cam 78 and the variable feed mechanism, either by varying the throw of pawl 122 through the adjustment of crank pin 138' in the slot in crank plate 21', or by angularly adjusting shield 127 to render available a greater or less portion of the total throw of pawl 122. Thus the normal straight spacing may be made either greater or less, and as the effect of the variable feed mechanism is superposed upon that due to pawl 122, the resultant rotation may be made greater or less, permitting the fasteners to be spaced for a curve of any desired radius.

The broad principles of the invention can be carried out otherwise than as herein specifically shown, and the invention is not to be limited except as required by the scope of the appended claims.

What is claimed, is:

1. The method of making fasteners adapted to a curved closure consisting in affixing jaw members in spaced groups on a continuous stringer in predetermined number while increasing the spacing of the members of one group and decreasing the spacing of the members of a succeeding group, and cutting such continuous stringer so that said groups may respectively conform to the respective sides of the closure and interlock with each other in a line following the mean curve of the closure.

2. The combination with means for affixing groups of jaw members to a strip, of means for varying the spacing between members at a predetermined part of a group.

3. The combination with means for affixing complementary groups of fastener members to a strip with predetermined spacing, of means for varying the spacing at the intermediate portion of the group.

4. The combination with means for affixing complementary groups of members to a strip with predetermined spacing, of means for increasing the spacing at one portion of one group and decreasing the spacing at a corresponding portion of another group.

5. The combination with means for feeding a strip and means for affixing jaw members on the edge thereof, of means for varying the spacing of the members on predetermined portions of the strip to produce portions of complementary spacing adapted to form inner and outer members of a curved fastener.

6. The combination with means for feeding a strip and means for affixing jaw members on the edge thereof, of means comprising a feed driven with a predetermined variation of movement relatively to a standard to vary the spacing of the members at a portion of the strip.

7. The combination with means for feeding a strip and means for affixing members spaced for curvilinear interlocking on the edge of said strip, of a strip feed having actuating means for effecting normal interlocking spacing of said members, means for effecting an increased strip feed after affixing a predetermined number of members, and means for varying the normal spacing of members on a predetermined portion of said strip for a predetermined curve.

8. In a fastener making machine, the combination with a feed roll, of means for intermittently rotating said roll, means supplemental to first said means for adding to or subtracting from each impulse thereof a supplemental rotation, and automatic means for starting and stopping the operation of said supplemental means at predetermined times in relation to first said means.

9. The combination with an intermittently driven feed roll, of a differential driving connection between said feed roll and its driving means, and means for controlling said differential driving connection to effect a constant, increased or decreased feed.

10. The combination with a roll for intermittently feeding a strip, of an actuating ratchet, a differential driving connection between said ratchet and said feed roll, and means for controlling said differential driving connection to effect a constant, increased or decreased feed.

11. In a fastener making machine, the combination with a feed roll, of intermittently rotating actuating means, a coupling between said actuating means and said roll, a cam in said coupling for adding to or subtracting from each impulse of said actuating means a supplemental rotation, actuating means for said cam, and automatic means for starting and stopping the operation of said cam actuating means at predetermined times in relation to said intermittently rotating actuating means.

12. The combination with means for intermittently feeding a strip, of actuating means comprising a ratchet and a differential driving connection, a pawl for rotating the ratchet, means for periodically giving the ratchet an increased throw, and means controlling said differential driving connection to permit increased or decreased movement of said feeding means relatively to the normal movement of said ratchet.

13. The combination with means for intermittently feeding a strip, of actuating means comprising a ratchet and a differential driving connection, means for adjusting the normal throw of the ratchet, a pawl for rotating the ratchet, means for periodically giving the ratchet an increased throw, and means controlling said differential driving connection to permit increased or decreased movement of said feeding means relatively to the normal movement of said ratchet.

14. The combination with an intermittently driven feed roll, of a spiral cam driving connection, and means for controlling said cam connection to advance or retard the roll relatively to its normal feed.

15. The combination with an intermittently driven feed roll, of a spiral cam driving connection, and means for automatically controlling said cam connection to advance or retard the roll relatively to its normal feed.

16. The combination with an intermittently driven feed roll, of a spiral cam driving connection, and means, comprising a traveling drum, for controlling said cam connection to advance or retard the roll relatively to its normal feed.

17. The combination with an intermittently driven feed roll, of means for actuating said roll to give a normal feed, a lost motion connection comprising a spiral cam between said actuating means and the roll, and means for variably controlling the lost motion.

18. The combination with an intermittently driven feed roll, of means for actuating said roll to give a normal feed, a lost motion connection comprising a spiral cam between said actuating means and the roll, and means, comprising a double pawl, for variably controlling the lost motion.

19. The combination with means for feeding a strip and means for affixing groups of interlocking fastening members thereto, of a strip feed having actuating means for effecting normal interlocking spacing of said members, and means for varying the normal interlocking spacing of said members on a predetermined portion of the strip to permit of interlocking on a predetermined curve.

20. In a fastener making machine, the combination with a feed roll, of means for intermittently rotating said roll, means supplemental to first said means for adding to or subtracting from each impulse thereof a supplemental rotation, control means for said supplemental means, and means for varying the amount of the resultant rotation.

21. In a fastener making machine, the combination with a feed roll, of intermittently rotating actuating means, a coupling between said actuating means and said roll, a cam in said coupling for adding to or subtracting from each impulse of said actuating means a supplemental rotation, actuating means for said cam, control means for said cam actuating means, and means for varying the amount of the resultant rotation.

Signed at Meadville, in the county of Crawford and State of Pennsylvania, this 12th day of October A. D. 1918.

GIDEON SUNDBACK.

Witnesses:
C. I. CLANCEY,
I. W. LANG.